(12) United States Patent
Grgac et al.

(10) Patent No.: US 8,399,084 B2
(45) Date of Patent: Mar. 19, 2013

(54) RESISTIVE IMPLANT WELDING FOR ASSEMBLIES OF PLASTIC COMPONENTS

(75) Inventors: Steven Grgac, Mississauga (CA); Bradford D. Armstrong, Barrie (CA); Rudolpf A. Schrempf, Brampton (CA)

(73) Assignee: Magna International Inc. (CA)

( * ) Notice: Subject to any disclaimer, the term of this patent is extended or adjusted under 35 U.S.C. 154(b) by 293 days.

(21) Appl. No.: 12/746,374

(22) PCT Filed: Dec. 8, 2008

(86) PCT No.: PCT/CA2008/002128
§ 371 (c)(1),
(2), (4) Date: Aug. 10, 2010

(87) PCT Pub. No.: WO2009/070890
PCT Pub. Date: Jun. 11, 2009

(65) Prior Publication Data
US 2010/0304073 A1    Dec. 2, 2010

Related U.S. Application Data

(60) Provisional application No. 61/005,574, filed on Dec. 6, 2007.

(51) Int. Cl.
*B32B 3/06* (2006.01)
(52) U.S. Cl. .......................................... 428/60; 428/57
(58) Field of Classification Search ............... 428/57, 428/60; 156/273.7, 273.9
See application file for complete search history.

(56) References Cited

U.S. PATENT DOCUMENTS

| 4,865,674 A | 9/1989 | Durkin |
| 6,211,492 B1 * | 4/2001 | Tanaka et al. ................. 219/209 |
| 2007/0145736 A1 | 6/2007 | Krah |

FOREIGN PATENT DOCUMENTS

| CA | 2438120 | 8/2002 |
| CA | 2489687 | 1/2004 |
| CA | 2547508 | 5/2005 |
| CA | 2638387 | 1/2009 |
| DE | 199 13 500 A1 | 9/2000 |
| DE | 19913500 A1 | 9/2000 |
| EP | 1 097 797 A1 | 5/2001 |
| EP | 1097797 A1 | 5/2001 |
| FR | 2 334 485 | 7/1977 |
| FR | 2334485 A1 | 7/1977 |

(Continued)

*Primary Examiner* — Alexander Thomas
(74) *Attorney, Agent, or Firm* — Warn Partners, P.C.; Marc Luddy

(57) ABSTRACT

A novel method and set of structures for performing resistive implant welding of two plastic components to form an assembly. A first one of the components to be welded includes a channel structure which receives the resistive implant and maintains it in a desired position until the welding operation is performed. The second component to be welded includes a complementary structure including a land which is sized to engage the channel structure and captive resistive implant on the first component. The two components are pre-weld positioned with the land in the channel structure and the positioned components are then placed in a press which exerts a pre-selected pressure on the interface between the channel and the land. Next, a pre-selected electric current is passed through the resistive implant to heat it and to bring the plastic material of the channel structure and the land to their molten points, where they intermingle through the resistive implant. The electrical current is removed and the weld is allowed to cool to its finished state and the welded assembly is removed from the press.

7 Claims, 4 Drawing Sheets

FOREIGN PATENT DOCUMENTS

| | | |
|---|---|---|
| JP | 57 007219 | 1/1982 |
| JP | 57007219 A | 1/1982 |
| JP | 10 016061 | 1/1998 |
| JP | 10016061 A | 1/1998 |

\* cited by examiner

RESISTIVE IMPLANT WELDING FOR ASSEMBLIES OF PLASTIC COMPONENTS

CROSS-REFERENCE TO RELATED APPLICATIONS

This application is a PCT International Application of U.S. Patent Application No. 61/005,574 filed on Dec. 6, 2007. The disclosure of the above application is incorporated herein by reference. This application claims the benefit of U.S. Provisional Application No. 61/005,574, filed Dec. 6, 2007.

FIELD OF THE INVENTION

The present invention relates to resistive implant welding for assemblies of plastic components. More specifically, the present invention relates to a method of resistive implant welding and a set of structures molded on plastic components to be resistive implant welded into an assembly, the structures holding the resistive implant in place prior to and during the welding operation.

BACKGROUND OF THE INVENTION

A need exists to join thermoplastic components, such as those formed from glass fiber reinforced polypropylene, or the like, to other plastic components formed of similar materials. To date, such joining has been achieved via adhesives, mechanical fasteners, laser welding, sonic welding and/or vibration welding but each of these techniques suffers from disadvantages.

For example, low energy surface adhesives (LESA's) must be employed to adhesively join glass fiber reinforced polypropylene components. LESA's are expensive, typically require long cure times and can produce undesired fumes while they cure. These factors contribute to high manufacturing costs for assemblies joined by LESA's.

The joining of plastic components with mechanical fasteners can result in low strength joints, as the mechanical fasteners only connect the components at specific locations and can incur high labour costs to install. Further, such fasteners can be subject to mechanical failure and can result in failure of the assembly of components.

Laser welding can be employed to join plastic components, but at least one of the components must be at least partially transparent to the Laser energy for the process to work and this limits the type of material, finishes and colors of the components to be joined. Further, Laser welding is a linear process and thus long joints can take significant times to form as the laser must traverse the entire joint length. Further, laser welding techniques can limit the amount of glass fiber which can be added to the thermoplastic material, due to the scattering of the laser energy by the glass fibers and thus the mechanical properties of plastic components joined by laser welding can be unduly limited.

Vibration welding can also be employed to join plastic components but is limited to making planar joints which do not change profile and thus the use of vibration welding is often too limited for many desired assemblies. Sonic welding suffers from similar problems and is typically limited to making relatively short joints and has high associated equipment costs.

More recently, interest has developed in joining plastic components, such as glass fiber reinforced polypropylene components, via resistive implant welding. In this technique, an electrically conductive implant is positioned between the two components to be joined and pressure is applied to the area of the components contacting the implant. An electrical current is then passed through the implant causing it to heat and melt the material of the components adjacent it. The melted portions of the components intermingle under the applied pressure and, when the current is removed and the implant and components cool, a weld is formed between the components. Cycle times for the welding process of much less than a minute can be easily achieved.

While resistive implant welding has offered many advantages over other methods of joining plastic components, it has also suffered from disadvantages in that the placement and retention of the resistive implant between the components to be joined has been difficult to achieve and/or labour intensive.

SUMMARY OF THE INVENTION

It is an object of the present invention to provide a novel method and system for using resistive implant welding to join plastic components which obviates or mitigates at least one disadvantage of the prior art.

According to a first aspect of the present invention, there is provided a method of forming a weld between two plastic components, comprising the steps of: (i) on a first of the two plastic components, molding a channel structure having walls and a flat base to receive and maintain the position of a resistive implant; (ii) inserting a resistive implant into the channel structure; (iii) on the second of the two plastic components, molding a complementary structure to the channel structure, the complementary structure including a flat land, the land sized to be received in the channel structure; (iv) positioning the first and second components such that the land is located within the channel structure to form an interface therebetween; (v) applying a pre-selected pressure to the interface between the channel structure and the land; (vi) for a pre-selected period of time applying a pre-selected electric current through the resistive implant to heat the plastic material of the channel structure and the land to their molten point while maintaining the applied pressure; and (vii) allowing the heated plastic material to cool to complete the weld.

According to another aspect of the present invention, there is provided a first plastic component and a second plastic component to be joined by a weld formed by resistive implant welding, comprising: a first plastic component including a channel structure have a flat base with spaced upstanding first and second side walls, the channel structure further including a set of implant retention members spaced along its length, the implant retention members operable to engage and retain a resistive implant inserted into the channel structure; and a second plastic component having a complementary structure to the channel structure and including a flat land to engage the flat base of the channel structure when the second component is positioned with the first component for a weld to be formed.

The present invention provides a novel method and set of structures for performing resistive implant welding of two plastic components to form an assembly. A first one of the components to be welded includes a channel structure which receives the resistive implant and maintains it in a desired position until the welding operation is performed. The second component to be welded includes a complimentary structure including a land which is sized to engage the channel structure and captive resistive implant on the first component. The two components are pre-weld positioned with the land in the channel structure and the positioned components are then placed in a press which exerts a pre-selected pressure on the interface between the channel and the land. Next, a pre-selected electric current is passed through the resistive implant to heat it and to bring the plastic material of the channel structure and the land to their molten points, where they intermingle through the resistive implant. The electrical current is removed and the weld is allowed to cool to its finished state and the welded assembly is removed from the press.

BRIEF DESCRIPTION OF THE DRAWINGS

Preferred embodiments of the present invention will now be described, by way of example only, with reference to the attached Figures, wherein:

FIG. 3b shows a plan view of the resistive implant of FIG. 3a; and

DETAILED DESCRIPTION OF THE INVENTION

As used herein, the term "plastic" is intended to comprise thermoplastic materials in general and such thermoplastic materials can include added materials, such as glass fibers, to alter their mechanical properties. While some of the following discussion makes reference to glass fiber reinforced polypropylene plastics, the present invention is not limited to use with these specific materials.

As discussed above, resistive implant welding is known. In general, the technology of resistive implant welding is described in, "Resistive Implant Welding of Glass Fiber Reinforced Polypropylene Compounds", by Bates, Tan, Zak and Mah, published by the Society of Automotive Engineers, SAE Technical Papers, document number 2006-01-0332 and the contents of this paper are included herein, in its entirety, by reference.

As is discussed in the Bates paper, one presently preferred resistive implant is a stainless steel mesh with wires of 0.009 inches diameter woven in a plain weave of sixteen wires to the inch. In the prior art, this implant is then positioned between the two surfaces of the components to be joined and pressure is applied to the components adjacent the implant. An electrical current is applied to the implant and the current passage through the stainless mesh generates heat which, in combination with the applied pressure, forms a weld between the two surfaces when the current is removed and the weld cools.

While the prior art technique can result in good welds between the components, it has proven to be difficult and labour intensive to position the implant in a desired position and to maintain it there during the heating and joining process. This is especially true if the weld is to be formed along join lines with complex geometries that can include curves, profile changes, etc.

In order to address this difficulty and to render resistive implant welding conducive to mass production techniques, the present inventors have developed a unique set of structures which are molded within the components to be welded and which cooperate to locate and maintain the resistive implant in a desired location. Further, these structures cooperate to ensure the formation of a satisfactory weld.

Figure 1:
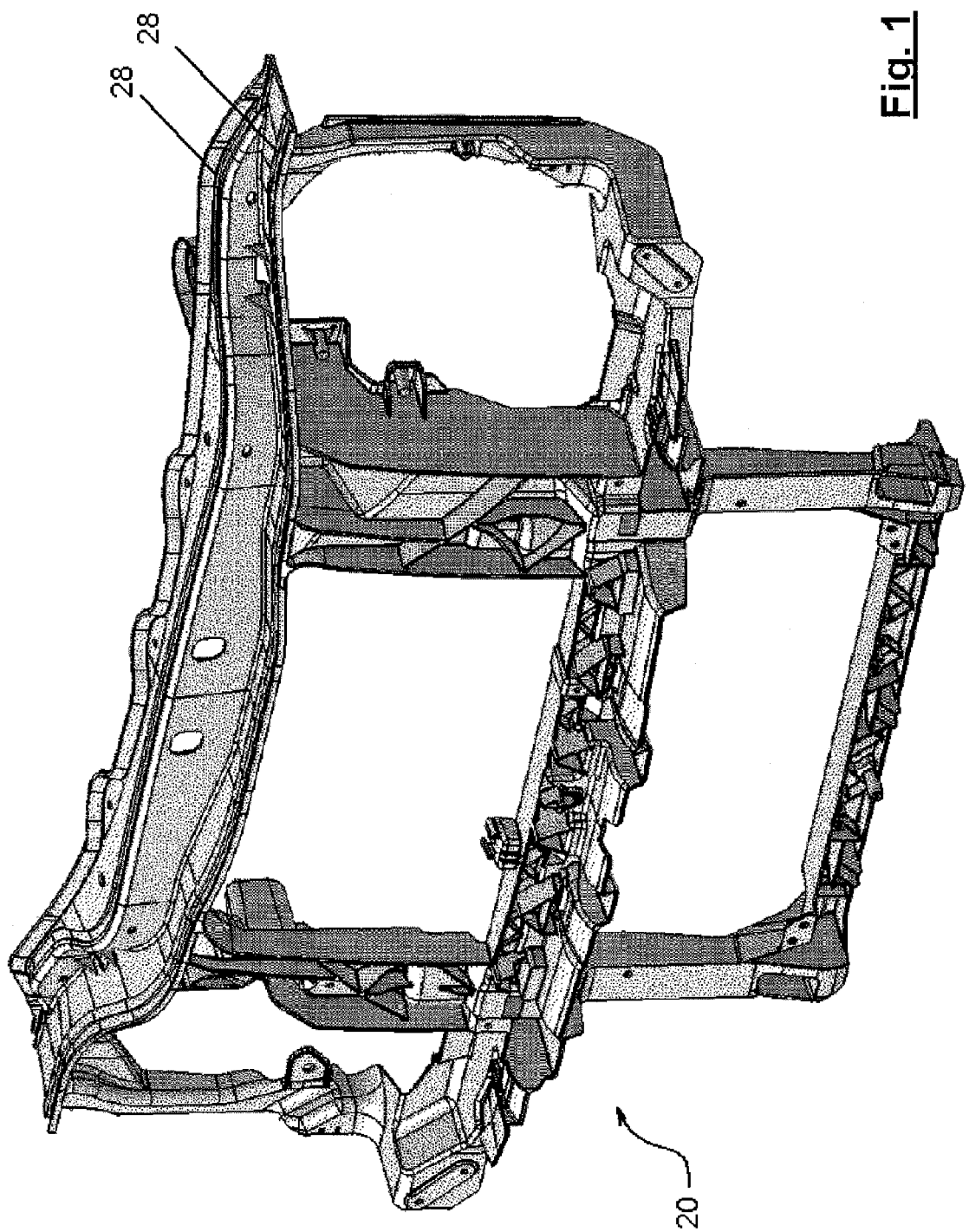
FIG. 1 shows a perspective view of a plastic component which is a part of a desired assembly.
Figure 2:
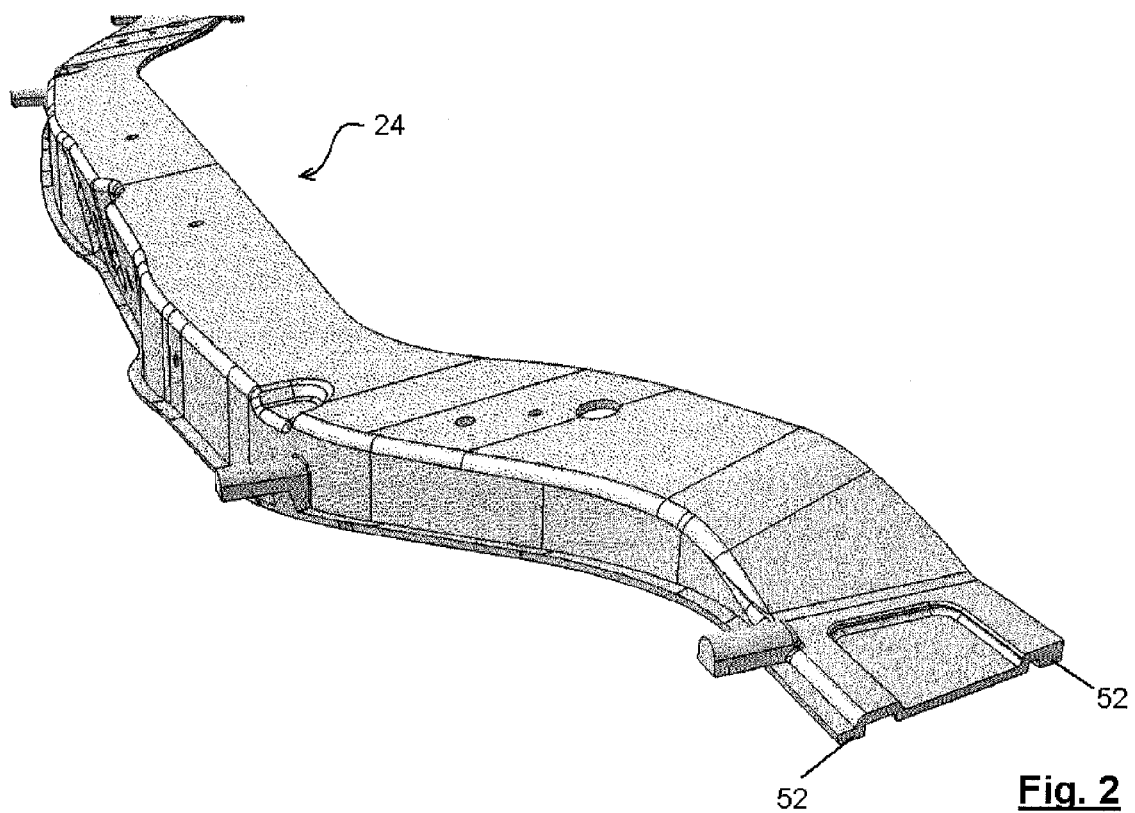
FIG. 2 shows a perspective view of another plastic component which is to be joined with the component of FIG. 1 to form the assembly.

Specifically, FIG. 1 shows a first component 20, molded from glass fiber reinforced polypropylene. Component 20 is one part of a front body carrier assembly for a vehicle. To increase the torsional rigidity and strength of the front body carrier assembly, it is desired to join a separately molded cap component 24, shown in FIG. 2, across the top of component 20. In the prior art, this joint was achieved with a LESA adhesive which required many hours to completely cure.

In the present invention, one of the two components to be joined is molded with a channel to receive the resistive implant. In the illustrated embodiment, component 20 is molded with channel 28 which receives a resistive implant 32.

Figure 3A:
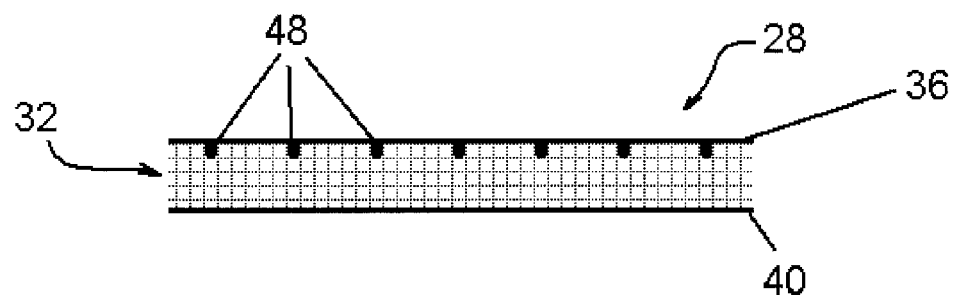
FIG. 3a shows a schematic plan view of a resistive implant and a structure which can be formed on a component to position and maintain the resistive implant in place prior to a welding operation.

As best seen in FIG. 3a, channel 28 comprises first side wall 36 and second side wall 40 between which resistive implant 32 is inserted. The bottom of channel 28, between first side wall 36 and second side wall 40 is a substantially flat surface and resistive implant 32 is adjacent to this flat surface.

Figure 3B:
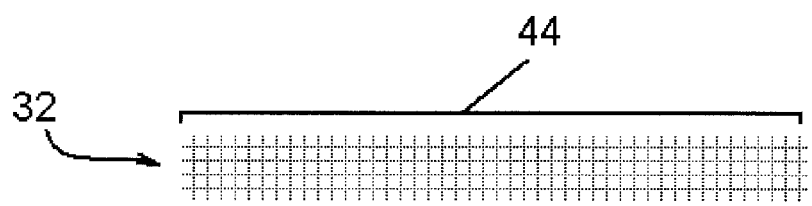

As shown in FIG. 3b, resistive implant 32 is formed with the mesh of at least one of its longitudinal sides 44 having open cells. At least one of first side wall 36 and second side wall 40 includes a set of implant retention members 48 located at intervals along channel 28 and which are sized to frictionally engage the open mesh cells of side 44 to retain implant 32 between first side wall 36 and second side wall 40, urged against first side wall 40.

To accommodate the geometries of the components to be joined, channel 28 can include profile changes and curved portions, changes in elevation, etc. As is understood by those of skill in the art, as resistive implant 32 is inserted in channel 28, it will deform about any curved portions, resulting in its width being reduced around the curves. The extent of this width reduction can be determined and channel 28 will be constructed with the spacing between first side wall 36 and second side wall 40 varied as needed so that first side wall 36 and second side wall 40 are closely proximal to the outer edges of resistive implant 32 even about curves.

The other of the two components to be joined, in the illustrated example cap component 24, includes a complementary land 52 which includes a flat surface to engage the surface of resistive implant 32 when the components are positioned for the welding operation. Further, land 52 has a width which fits closely between the inner tips of implant retention members 48 and second side wall 40 or, in the case of both of side walls 36 and 40 including implant retention members 48, between the inner tips of those opposed implant retention members 48.

To form a weld, a pre-selected length of resistive implant material 32 is placed in each channel 28 with the implant retention members 48 maintaining the resistive implant in place against wall 40. Next, the component with complementary land 52 is positioned such that land 52 is located in channel 28.

Figure 4:
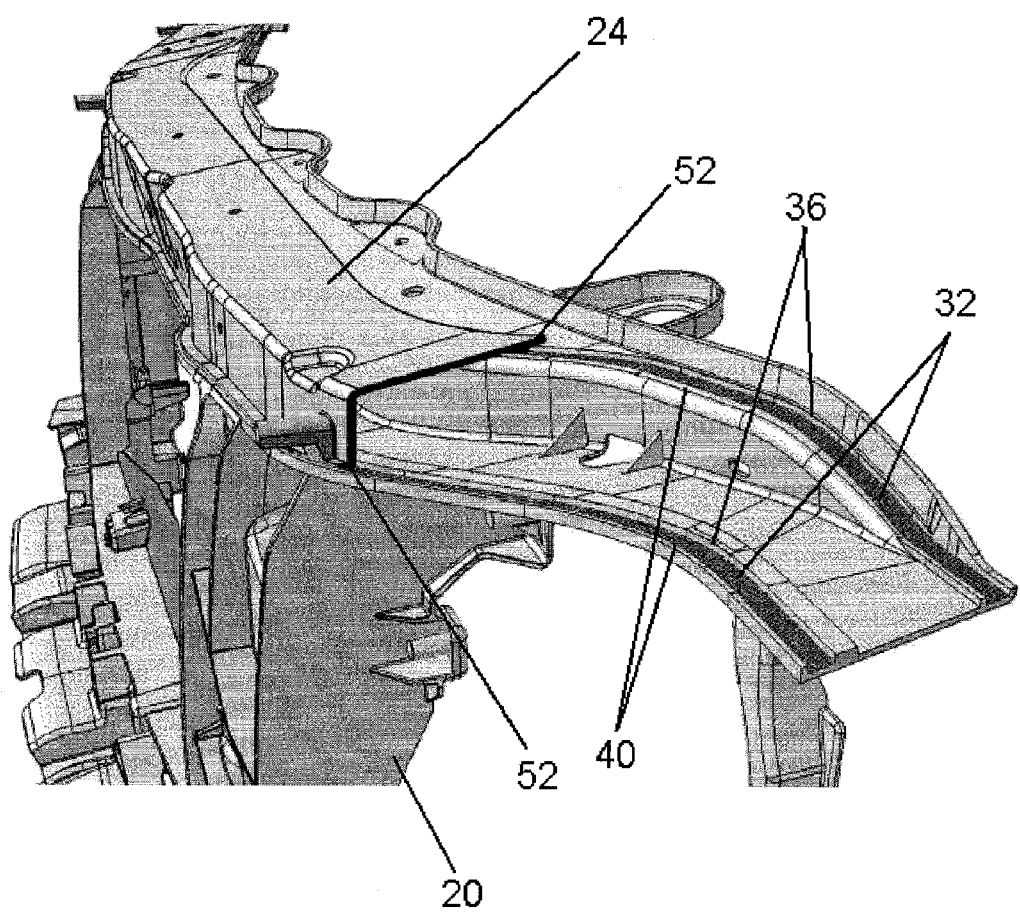
FIG. 4 shows a partially cut away perspective view of a pre-weld positioning of the components of FIGS. 1 and 2.

FIG. 4 shows the pre-weld assembly of component 20 and component 24 with resistive implants 32 in place for the welding operation.

The pre-weld assembly of component 20 and component 24 is then placed in a press. As pressure must be applied to land 52 and the flat surface in channel 28 upon which resistive implant 32 rests during the weld process, the press includes a lower die with a surface complementary in shape to the surface of component 20 below channel 28 and an upper die with a surface complementary in shape to the surface of component 24 above land 52. The press is then closed, applying an appropriate pressure to components 20 and 24.

An electrical conductor is then connected to the ends of resistive implant 32 and a pre-selected electric current is passed through resistive implant 32 for a pre-selected period of time. As the electric current passes through resistive implant 32, resistive implant 32 is heated and the plastic material in channel 28 under resistive implant 32 and in land 52 over resistive implant 32 is heated to its molten temperature. The pressure applied by the press to components 20 and 24 results in the molten materials intermingling, through the mesh of resistive implant 32.

After the pre-selected period of time, the electric current is removed and the heated plastic materials are allowed to cool while pressure is maintained on them by the press. After a sufficient cooling off period has passed, the press is opened and the completed assembly of components 20 and 24 can be removed.

As will be apparent to those of skill in the art, the amount of electric current passed through resistive implant 32 and the pre-selected time period in which the current is applied are dependent upon several variables, including the type of plastic material being welded, the width of the weld joint, the electrical resistance of resistive implant 32, etc. However, it is contemplated that those of skill in the art will be able to determine appropriate values empirically or by any other suitable means as will occur.

Similarly, the appropriate pressure to be applied to channel 28 and land 52 during the welding operation depends upon a variety of factors, again including the type of plastic material being welded, the width of the weld joint, etc. It is again contemplated that those of skill in the art will be able to determine appropriate pressures empirically or by any other suitable means as will occur. However, it should be noted that the quality of the resulting weld is dependent upon the maintenance of the appropriate pressure throughout the welding process. As the thickness of the pre-weld assembled components reduces as the material of channel 28 and land 52 is raised to a molten temperature, the press should be adjusted, if necessary, during the welding operation to maintain the appropriate pressure.

In tests of the present invention, with components 20 and 24 having wall stock thicknesses of three millimeters, the welds formed between channels 28 and lands 52 have been found to be stronger than the surrounding materials. Further weld cycle times, including cooling of the weld, have been found to be less than one minute.

The present invention provides a novel method and set of structures for performing resistive implant welding of two plastic components to form an assembly. A first one of the components to be welded includes a channel structure which receives the resistive implant and maintains it in a desired position until the welding operation is performed. The second component to be welded includes a complementary structure including a land which is sized to engage the channel structure and captive resistive implant on the first component. The two components are pre-weld positioned with the land in the channel structure and the positioned components are then placed in a press which exerts a pre-selected pressure on the interface between the channel and the land. Next, a pre-selected electric current is passed through the resistive implant to heat it and to bring the plastic material of the channel structure and the land to their molten points, where they intermingle through the resistive implant. The electrical current is removed and the weld is allowed to cool to its finished state and the welded assembly is removed from the press.

The method and structures of the present invention are used either manually or incorporated into an automated production line. Thus, manufacture of resistive implant welded components as set forth in the present invention is readily accomplished robotically or otherwise in an automated or partially automated assembly line.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A front body carrier assembly for a vehicle having at least two plastic components joined by resistive implant welding, comprising:
   a front body carrier assembly for a vehicle including a first plastic component having a channel structure including a first side wall; a second side wall and a flat base disposed substantially between said first side wall and said second side wall such that said resistive implant is located substantially adjacent to said flat base and between said first side wall and said second side wall;
   a resistive implant disposed in said channel structure; and
   a second plastic component of said front body carrier assembly having a complementary structure, said complementary structure being disposed in said channel structure such that said complementary structure is substantially adjacent to said resistive implant, and a electrical current is applied to said resistive implant to generate heat, thereby joining said complementary structure to said channel structure; and
   a plurality of implant retention members located on one of said first side wall or said second side wall at intervals along said channel structure, wherein said plurality of implant retentions members frictionally engage said resistive implant and retain said resistive implant between said first side wall and said second side wall.

2. The front body carrier assembly for a vehicle having at least two plastic components joined by resistive implant welding of claim 1, said resistive implant further comprising:
   a wire mesh having at least one longitudinal side; and
   a plurality of open cells formed along said at least one longitudinal side of said wire mesh.

3. The front body carrier assembly for a vehicle having at least two plastic components joined by resistive implant welding of claim 2, said wire mesh further comprising wires of substantially 0.0009 inches in diameter.

4. The front body carrier assembly for a vehicle having at least two plastic components joined by resistive implant welding of claim 1, wherein an electrical current is applied to said resistive implant to generate heat, joining said complementary structure to said channel structure.

5. The front body carrier assembly for a vehicle having at least two plastic components joined by resistive implant welding of claim 4, wherein pressure is applied to said first plastic component and said second plastic component as current is applied to said resistive implant, further joining said complementary structure and said channel structure.

6. The front body carrier assembly for a vehicle having at least two plastic components joined by resistive implant welding of claim 1, said channel structure further comprising at least one curved portion, wherein said resistive implant deforms about said at least one curved portion when said resistive implant is placed in said channel structure.

7. The front body carrier assembly for a vehicle having at least two plastic components joined by resistive implant welding of claim 1, said complementary structure further comprising a flat land engaged with said channel structure such that when said first plastic component is joined to said second plastic component, said flat land will be joined to said channel structure.

* * * * *